United States Patent
Ishida et al.

(10) Patent No.: US 10,046,860 B2
(45) Date of Patent: Aug. 14, 2018

(54) WINDSHIELD DEVICE, AIRCRAFT, AND POWER CONTROL METHOD FOR WINDSHIELD HEATER

(71) Applicant: Mitsubishi Aircraft Corporation, Aichi (JP)

(72) Inventors: Toshiyuki Ishida, Tokyo (JP); Masatoshi Morishita, Tokyo (JP); Yoichi Uefuji, Tokyo (JP); Gento Ichikawa, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 6 days.

(21) Appl. No.: 15/041,337

(22) Filed: Feb. 11, 2016

(65) Prior Publication Data

US 2016/0272332 A1 Sep. 22, 2016

(30) Foreign Application Priority Data

Mar. 16, 2015 (JP) ................... 2015-052074

(51) Int. Cl.
*B64D 15/12* (2006.01)
*B64D 15/22* (2006.01)
(Continued)

(52) U.S. Cl.
CPC ............ *B64D 15/22* (2013.01); *B64C 1/1484* (2013.01); *B64D 15/12* (2013.01); *B64D 15/20* (2013.01); *H05B 1/0236* (2013.01); *H05B 3/84* (2013.01)

(58) Field of Classification Search
CPC ......... B64D 15/00; B64D 15/12; B64D 15/22
(Continued)

(56) References Cited

U.S. PATENT DOCUMENTS 5,496,989 A * 3/1996 Bradford ................. B60S 1/026
219/482
6,627,851 B2 * 9/2003 Sangwan ................. H05B 3/84
219/203
(Continued)

FOREIGN PATENT DOCUMENTS

DE 19722577 A1 12/1998
EP 1318697 A1 6/2003
JP 4546537 B2 9/2010

OTHER PUBLICATIONS

Vaisala, "Humidity Conversion Formulas: Calculation formulas for humidity"; 2013; <https://www.vaisala.com/sites/default/files/documents/Humidity_Conversion_Formulas_B210973EN-F.pdf>.*

*Primary Examiner* — Kimberly S Berona
*Assistant Examiner* — Anshul Sood
(74) *Attorney, Agent, or Firm* — Pearne & Gordon LLP

(57) ABSTRACT

The present invention provides a windshield device including: a windshield; a heater that is provided in the windshield and configured to generate heat by energization; a temperature sensor that is provided in the windshield and configured to detect a temperature; and a control unit that performs power control on the heater. The control unit is configured to supply an input power to the heater, the input power being acquired by applying a detected temperature detected by the temperature sensor to a function that is determined in accordance with a dew-point temperature of an inside of a compartment separated from an outside of the compartment by the windshield.

13 Claims, 13 Drawing Sheets

(51) Int. Cl.
  *H05B 3/84* (2006.01)
  *H05B 1/02* (2006.01)
  *B64D 15/20* (2006.01)
  *B64C 1/14* (2006.01)
(58) Field of Classification Search
  USPC .......................................................... 701/36
  See application file for complete search history.

(56) References Cited

U.S. PATENT DOCUMENTS

2006/0086715 A1    4/2006  Briggs
2008/0168785 A1*   7/2008  Sauer ................. B60H 1/00785
                                                    62/176.6

* cited by examiner

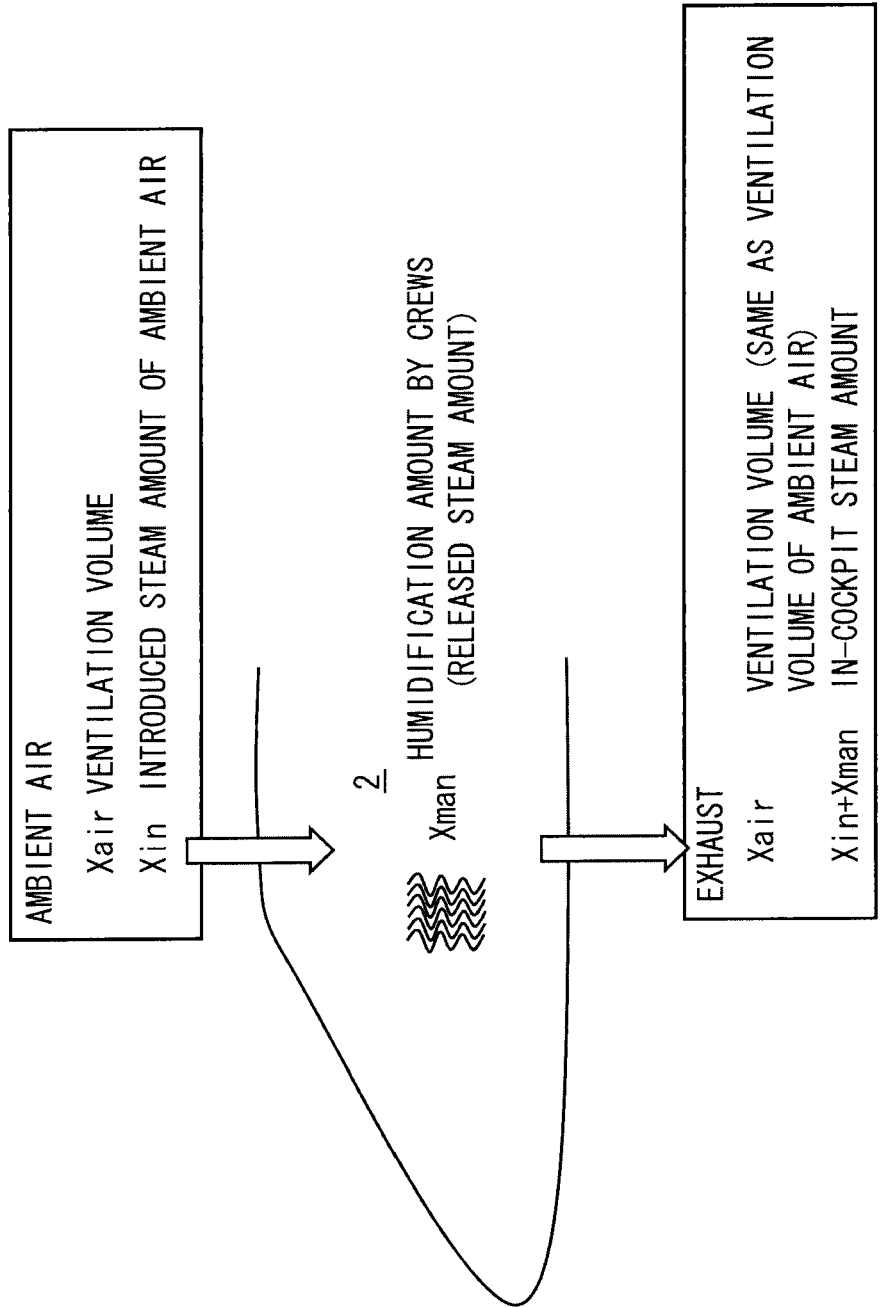

US 10,046,860 B2

WINDSHIELD DEVICE, AIRCRAFT, AND POWER CONTROL METHOD FOR WINDSHIELD HEATER

BACKGROUND OF THE INVENTION

Field of the Invention

The present invention relates to power control of a heater that is provided in a windshield for an aircraft or the like.

Description of the Related Art

A transparent film heater is incorporated into a windshield provided in a cockpit of an aircraft for the purpose of anti-icing and anti-fogging (e.g., Japanese Patent No. 4546537).

In Japanese Patent No. 4546537, a film heater is supplied with a source power in accordance with the temperature of a windshield.

SUMMARY OF THE INVENTION

Heating a windshield by a heater is controlled so as to avoid both icing on the outer surface of the windshield and fogging on the inner surface of the windshield, and the temperature of the windshield is maintained such that anti-icing and anti-fogging conditions are all satisfied. Therefore, even in the case where there is no risk of icing, and an outboard temperature is not low, a windshield temperature reaches a temperature that is higher than the room temperature in a cockpit at which condensation does not occur, resulting in an unnecessarily enormous consumption of electricity.

Thus, the present invention has an objective to achieve power saving by appropriately performing power control on a windshield heater.

A windshield device according to the present invention includes: a windshield; a heater that is provided in the windshield and configured to generate heat by energization; a temperature sensor that is provided in the windshield and configured to detect a temperature; and a control unit that performs power control on the heater, wherein the control unit is configured to supply an input power to the heater, the input power being acquired by applying a detected temperature detected by the temperature sensor to a function that is determined in accordance with a dew-point temperature of an inside of a compartment separated from an outside of the compartment by the windshield.

The control unit of the windshield device according to the present invention preferably performs feedback control on the temperature of the heater using the detected temperature.

The control unit of the windshield device according to the present invention preferably updates the function in accordance with the dew-point temperature.

In the windshield device according to the present invention, the function can be expressed by an index temperature line that connects: a point representing a first preset temperature and a high input power for the heater corresponding to the first preset temperature, the first preset temperature being the dew-point temperature plus a first margin; and a point representing a second preset temperature and a low input power for the heater corresponding to the second preset temperature, the second preset temperature being the dew-point temperature plus a second margin that is larger than the first margin.

In the windshield device according to the present invention, a dew-point temperature acquisition unit preferably acquires the dew-point temperature using the compartment humidity of the inside of the compartment that is acquired using: a ventilation volume between the inside of the compartment and ambient air, a steam amount contained in the ambient air, and a humidification amount released from a moisture source (crews or the like) in the inside of the compartment; and the pressure of the inside of the compartment.

In the windshield device according to the present invention, the control unit preferably has a power saving mode in which the input power having a relationship with the dew-point temperature is supplied to the heater, as one of a plurality of modes for performing power control on the heater.

An aircraft according to the present invention includes any one of the above-described windshield devices.

A power control method for a windshield heater according to the present invention includes supplying an input power to the heater, the input power being acquired by applying the detected temperature of a windshield to a function that is determined in accordance with a dew-point temperature of the inside of a compartment separated from the outside of the compartment by the windshield.

The power control method for a windshield heater according to the present invention includes: a first step of detecting the presence of an iced condition in which icing occurs on the windshield; and a second step of supplying the input power having a relationship with a dew-point temperature to the heater, wherein the second step is preferably performed when the presence of the iced condition is not detected in the first step.

In the power control method for a windshield heater according to the present invention, a mode can be switched between a high-power mode and a power saving mode, the high-power mode being a mode in which an input power in conformity with the detected temperature of the windshield is supplied to the heater, the power saving mode being a mode in which the input power having a relationship with the dew-point temperature is supplied to the heater.

The power control method for a windshield heater according to the present invention is preferably applied to the heater of a windshield provided in an aircraft.

According to the present invention, a windshield is heated to a required degree by the supply of input power related to a dew-point temperature to a heater, thereby enabling the achievement of power saving.

BRIEF DESCRIPTION OF THE DRAWINGS

FIG. 4 is a diagram for the description of calculating the humidity of the inside of the cockpit;

DETAILED DESCRIPTION OF THE PREFERRED EMBODIMENTS

Hereinafter, embodiments of the present invention will be described with respect to the accompanying drawings.

First Embodiment

Figure 1A:
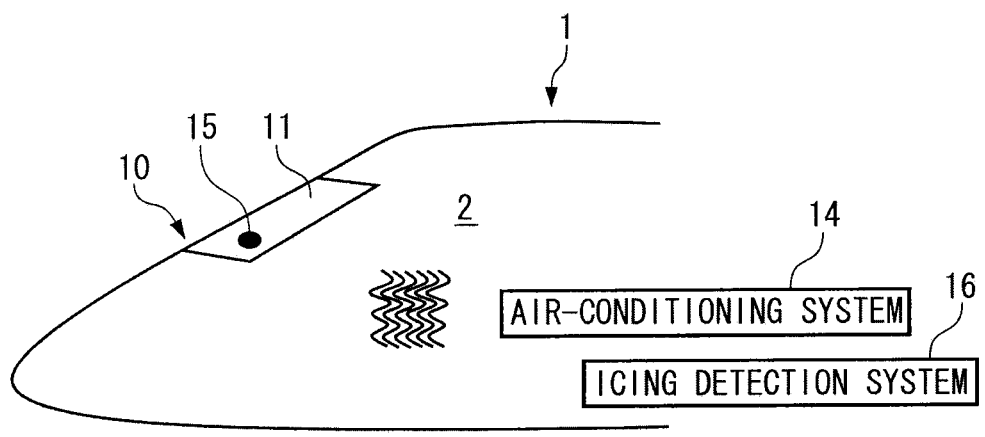
FIG. 1A is a schematic diagram illustrating the cockpit and a windshield of an aircraft according to a first embodiment.

As illustrated in FIG. 1A, a windshield device 10 is installed in a cockpit 2 of an aircraft 1.

Figure 1B:
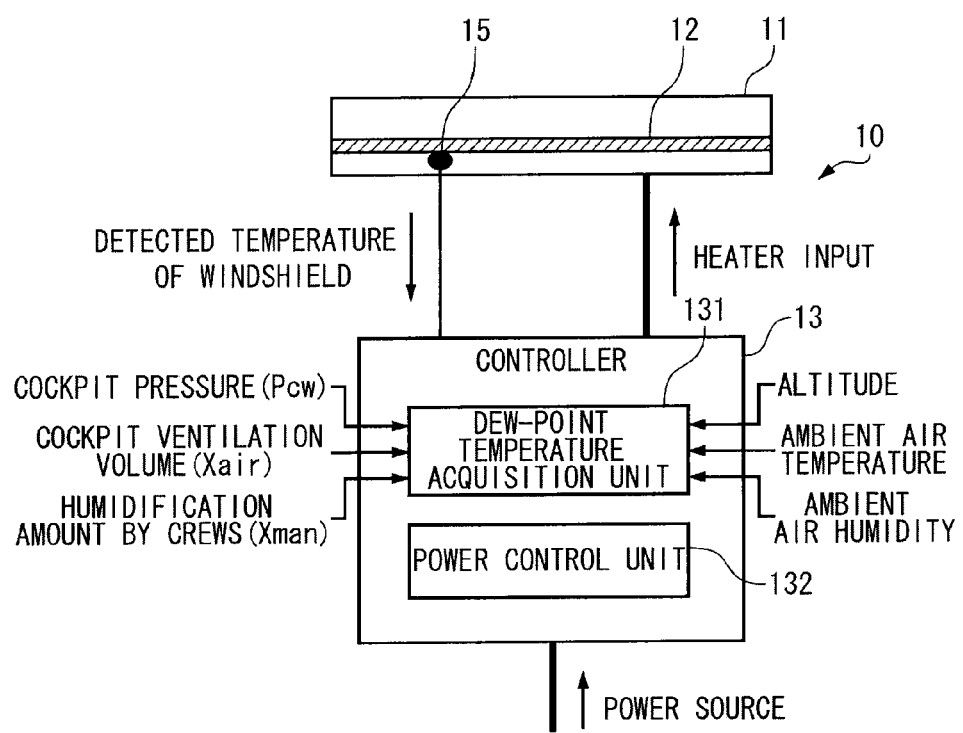
FIG. 1B is a block diagram illustrating the heater of the windshield, a controller, and pieces of information used for power control of the heater.

The windshield device 10 includes, as illustrated in FIG. 1B, a windshield 11 that secures a field of view, a heater 12 that is incorporated into the windshield 11, and a controller 13 that performs power control on the heater 12.

The inside of the cockpit 2 is pressurized, air conditioned, and ventilated by an air-conditioning system 14 that is installed in the aircraft 1. The air-conditioning system 14 uses bleed air from an engine of the aircraft 1 as a heat source and a pressure source.

The windshield 11 includes two front windshields that are disposed in such a manner as to face forward in the traveling direction of the aircraft 1, and side windshields that are disposed on the left side and the right side of the front windshields, respectively, in such a manner as to face sideward, although specific illustrations thereof will not be illustrated.

Hereafter, the front windshields and the side windshields are collectively referred to as the windshield 11.

The windshield 11 is a layered body including a plurality of transparent windshield panels that are formed of a glass, an acrylic resin, or the like.

The layered body includes a layer that absorbs impact and the heater 12 that heats the windshield 11.

The heater 12 is a conductive member having a predetermined electric resistance and configured to generate Joule's heat by being energized by the controller 13.

In the present embodiment, a temperature sensor 15 is also incorporated into the layered body. The temperature sensor 15 is disposed near the heater 12, and detects the temperature of the heater 12.

In the present embodiment, the temperature of the heater 12 to be subjected to the power control is directly detected by the temperature sensor 15. Hence, there is a smaller error in detected temperature as compared with the case where, for example, the temperature sensor 15 detects the temperature of the surface of the windshield 11 that is heat-transferred by the heater 12, enabling more accurate control of the heater 12.

The heater 12 prevents the windshield 11 from fogging due to the difference in temperature between ambient air and air within the cockpit 2 (anti-fogging function). In addition, the heater 12 prevents ice from adhering to the windshield 11 due to the collision of droplets of supercooled water or ice grains that form clouds (anti-icing function).

The aircraft 1 is equipped with an icing detection system 16 that detects the presence of an iced condition based on the diameters of water droplets in ambient air in order to reliably prevent the adhesion of ice to an engine nacelle, a leading-edge of a main wing, or the like, as well as the windshield 11.

The anti-icing function is not requisite for the side windshields to which the adhesion of ice is difficult to occur as compared to the front windshields. It is sufficient that the front windshields positioned at the front end of the aircraft 1 have the anti-icing function. The anti-icing requires a high heating ability as compared with the anti-fogging, and it is preferable that a heater 12 used for the front windshields has a high output as compared with a heater 12 for the side windshields.

Ice adheres to the surface on the outside (the outer surface) of the windshield 11 contacts ambient air, whereas fogging mainly occurs on the surface on the inside (the inner surface) of the windshield 11. Therefore, it is preferable to dispose a heater 12 near the outer surface of the front windshield, and a heater 12 near the inner surface of the side windshield.

As the heater 12 of the present embodiment, a transparent or substantially transparent thin film made of an Indium Tin Oxide (ITO), gold, silver, or the like can be used. In that case, the heater 12 can be formed on a windshield panel by vapor deposition or the like. Alternatively, a base film including the heater 12 formed thereon can be interposed between layers of the windshield 11.

Alternatively, for the heater 12, an electrically heated wire can be also used. The electrically heated wire can be interposed between layers of the windshield 11.

The heater 12 can be provided at an appropriate position in the thickness direction of the windshield 11. For example, in the case where the windshield 11 includes, as the windshield panels, an outer panel disposed on an outboard side and an inner panel disposed on an aircraft inner side, the heater 12 can be provided on a surface on the aircraft inner side of the outer panel or a surface on the outboard side of the inner panel. The heaters 12 may be provided on both the surface on the aircraft inner side of the outer panel and the surface on the outboard side of the inner panel.

When an ambient air temperature decreases with an increase in flight altitude, the windshield 11 is cooled, and the temperature of the inner surface also decreases. The inner surface temperature approaches the dew-point temperature of the inside of the cockpit, which easily causes the condensation of moisture in the air to cause fogging on the inner surface of the windshield 11. However, the fogging does not necessarily occur depending on the humidity of the inside of the cockpit 2.

When the power control is performed on the heater 12 nonetheless so as to provide a high output to a degree that in any case fogging does not occur on the windshield 11 and ice does not adhere regardless of the humidity of the inside of the cockpit 2, power is consumed more than necessary.

Thus, in the present embodiment, a dew-point temperature is acquired using the humidity of the inside of the cockpit 2, the windshield 11 is heated by the heater 12 to a required degree based on the dew-point temperature.

The controller 13 includes, as illustrated in FIG. 1B, a dew-point temperature acquisition unit 131 that acquires the dew-point temperature of the inside of the cockpit 2, and a power control unit 132 that supplies the heater 12 with an input power in response to the dew-point temperature.

The controller 13 can be formed by a computer including an arithmetic unit and a storage device. The dew-point temperature acquisition unit 131 and the power control unit 132 execute processes based on a computer program installed in the controller 13.

The dew-point temperature acquisition unit 131 is configured to acquire the dew-point temperature of the inside of the cockpit 2 using information on the inside and outside states of the cockpit 2 that have influences on the dew-point temperature of the inside of the cockpit 2.

The dew-point temperature acquisition unit 131 receives an altitude, an ambient air temperature, and an ambient air humidity as information indicating the outside state of the cockpit 2, namely, the state of ambient air, and receives the pressure of the inside of the cockpit 2, the ventilation volume of the cockpit 2, and a humidification amount by crews in the cockpit 2 as information indicating the inside state of the cockpit 2.

The altitude, the ambient air temperature, and the ambient air humidity are measured by a navigation system (not illustrated) installed in the aircraft 1 and transmitted from the navigation system to the dew-point temperature acquisition unit 131.

The dew-point temperature acquisition unit 131 can calculate an ambient air pressure from an altitude.

The pressure of the cockpit 2 (a cockpit pressure) is measured by the air-conditioning system 14 or set as a value used for the control, and transmitted from the air-conditioning system 14 to the dew-point temperature acquisition unit 131.

The ventilation volume between the inside of the cockpit 2 and the ambient air (a cockpit ventilation volume) is set in the air-conditioning system 14 as a value used for the control, and is transmitted from the air-conditioning system 14 to the dew-point temperature acquisition unit 131.

The humidification amount by crews is a steam amount (a steam mass) that is assumed to be released in the cockpit 2 by the exhalation or perspiration of the crews in the cockpit 2. The humidification amount by crews is set in the air-conditioning system 14 as a value used for the control, and is transmitted from the air-conditioning system 14 to the dew-point temperature acquisition unit 131.

The power control unit 132 inputs source power to the heater 12 using the power that is received from a power source line installed in the aircraft 1.

The power control unit 132 can control the output of heater 12 by changing the pulse width or the frequency of the input source power.

The power control unit 132 sets a control function that is defined in accordance with a dew-point temperature acquired using the information on the inside and outside states of the cockpit 2 that have an influence on the dew-point temperature of the inside of the cockpit 2, namely, an index temperature line to be described later. Then, the power control unit 132 supplies the heater 12 with an input power acquired by applying to the index temperature line a detected temperature detected by the temperature sensor 15.

Then, in flight, a dew-point temperature is continuously acquired by the dew-point temperature acquisition unit 131, and the index temperature line is updated in accordance with the acquired dew-point temperature.

In addition, the power control unit 132 of the present embodiment detects the temperature of heater 12 using the temperature sensor 15 on a predetermined cycle and performs feedback control on the temperature of the heater 12 using the detected temperature.

The cycle of the temperature detection by the temperature sensor 15 can be set at, for example, from about a few seconds to about a few minutes, more preferably, about a few seconds.

Also in the case where the dew-point temperature of the inside of the cockpit 2 is acquired in cycles, the cycle can be set at, for example, from about a few seconds to about a few minutes, more preferably, about a few seconds. The dew-point temperature is not necessarily acquired in cycles and may be acquired with an appropriate timing in flight.

The power control of the heater 12 will be described with reference to FIG. 2.

The power control unit 132 monitors whether the aircraft 1 is under an iced condition, through the icing detection system 16 (step S1). In addition, the power control unit 132 has a power saving mode M1 to be executed when the presence of the iced condition is not detected (N in step S1), and a high-power mode M2 to be executed when the presence of the iced condition is detected (Y in step S1).

In the high-power mode M2, the heater 12 is subjected to the power control at such a high output that there is no concern about the occurrence of icing or fogging even when the outside of the aircraft is under a harsh iced condition or the inside of the cockpit 2 is under a harsh humidity condition.

Figure 2:
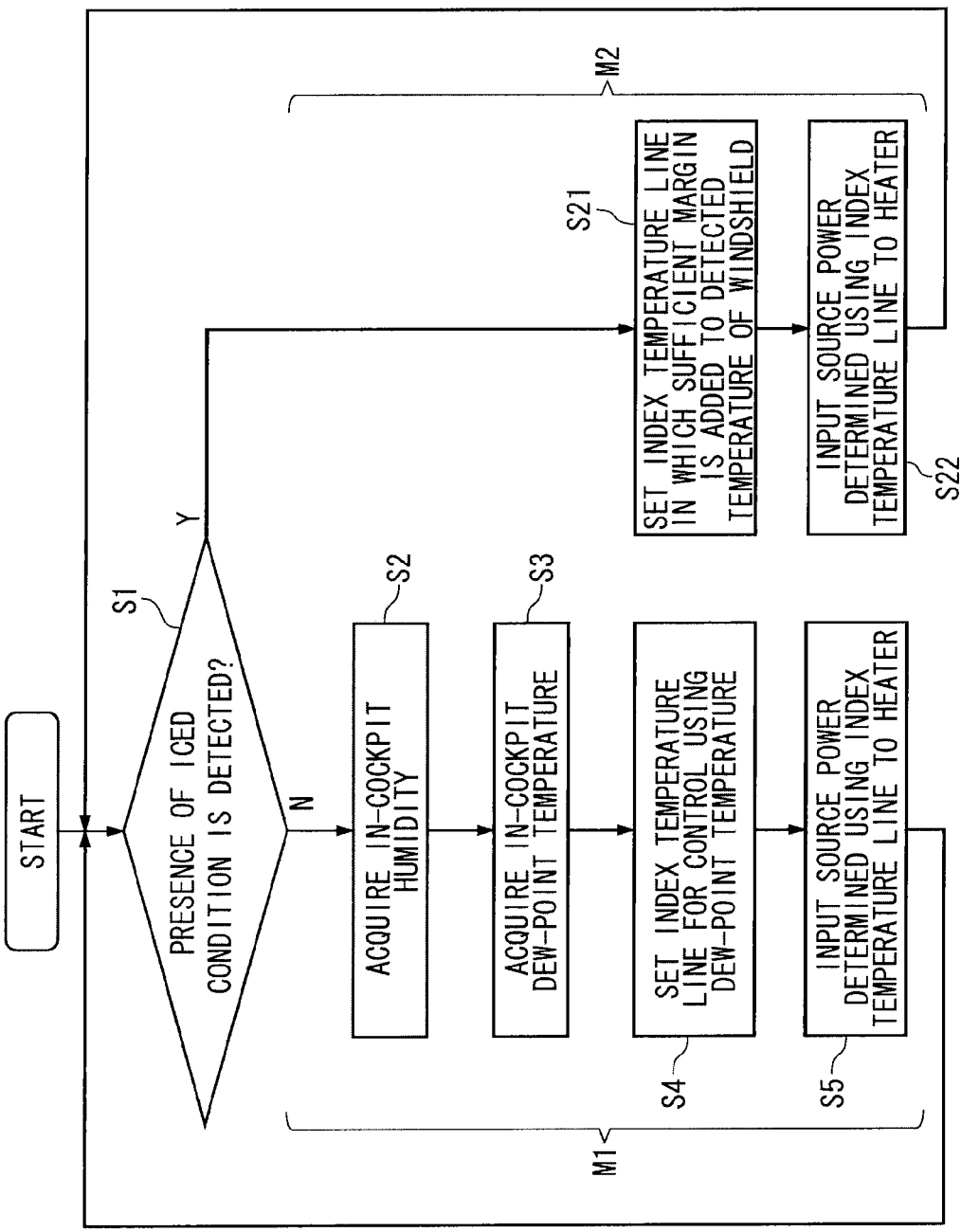
FIG. 2 is a flow chart illustrating the power control process of the heater in the first embodiment.
Figure 3A:
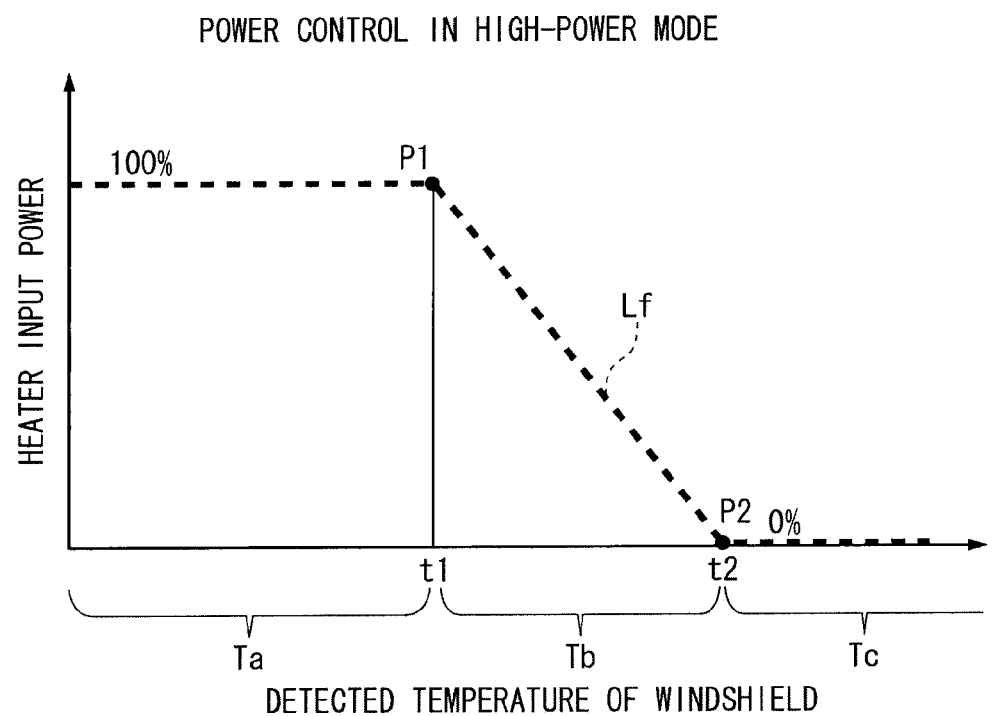
FIG. 3A is a graph illustrating the relationship between the detected temperature of the windshield and a heater input in a high-power mode.

In the high-power mode M2, as illustrated by steps S21 and S22 of FIG. 2 and in FIG. 3, the heater 12 receives a source power that is obtained by adding to the detected temperature detected by the temperature sensor 15 a sufficient margin.

A first temperature t1 and a second temperature t2 higher than the first temperature t1 are predetermined, and when the detected temperature by the temperature sensor 15 is fall within a temperature range Ta that is lower than the first temperature t1, a maximum input (100%) is supplied to the heater 12. When the detected temperature falls within a temperature range Tc that is higher than the second temperature t2, a minimum input (0%) is supplied to the heater 12. That is, the heater 12 is brought into an off state.

In addition, when the detected temperature falls within a temperature range Tb that is between the first temperature t1 and the second temperature t2, an input in accordance with the detected temperature by the temperature sensor 15 is supplied to the heater 12. In the example illustrated in FIG. 3, a heater input is linearly changed with respect to the detected temperature.

The first temperature t1 and the second temperature t2 are fixed to respective specified values. Hence, an index temperature line Lf, which is used for control within the temperature range Tb, is fixed. The index temperature line Lf is a line that connects a point P1 and a point P2, the point P1 representing the first temperature t1 and the maximum input (100%), the point P2 representing the second temperature t2 and the minimum input (0%).

Hereafter, the power saving mode M1 (FIG. 2) will be described.

In the power saving mode M1, the dew-point temperature acquisition unit 131 acquires the humidity of the inside of the cockpit 2 that has an influence on the dew-point temperature of the inside of the cockpit 2 (step S2), and calculates the dew-point temperature of the inside of the cockpit 2 based on a cockpit humidity and a cockpit pressure (step S3).

First, acquiring the humidity of the inside of the cockpit 2 (step S2) will be described.

The humidity of the inside of the cockpit 2 has a relationship with, as illustrated in FIG. 4, a ventilation volume $X_{air}$ for the cockpit 2, a steam amount contained in ambient air that is introduced into the cockpit 2 by ventilation (an ambient-air introduced steam amount) $X_{in}$, and a humidification amount $X_{man}$ by the crews in the cockpit 2 (a steam amount).

An absolute humidity Wc in the cockpit 2 is expressed by the following expression (1).

[Expression 1]

$$W_C = \frac{Xin + Xman}{Xair} \quad (1)$$

The ventilation volume Xair can be calculated by, for example, multiplying a ventilation volume necessary per crew member by the number of crew members (pilots) on board the cockpit 2.

The humidification amount Xman can be calculated by, for example, multiplying a released steam amount per crew member by the number of crew members in the cockpit 2.

In the present embodiment, the ventilation volume Xair and the humidification amount Xman are acquired from the air-conditioning system 14.

The ambient-air introduced steam amount Xin can be calculated by the following expression (2).

[Expression 2]

$$Xin = Wamb \times Xair \quad (2)$$

where Wamb denotes the absolute humidity of ambient air. To calculate Wamb, the ambient air temperature and the ambient air pressure acquired from the navigation system can be used.

In such a manner, the cockpit absolute humidity Wc can be calculated by applying the ambient-air introduced steam amount Xin, the ventilation volume Xair, and the humidification amount Xman to the expression (1).

Subsequently, a dew-point temperature DP can be calculated using a steam pressure Pcw in the cockpit 2 calculated from the cockpit absolute humidity Wc and the cockpit pressure (step S3). To calculate Pcw, the cockpit pressure acquired from the air-conditioning system 14 can be used.

As described above, according to the present embodiment, it is possible to acquire the dew-point temperature DP of the inside of the cockpit 2 by making use of various kinds of information that are transmitted to the controller 13 through a predetermined system.

When the dew-point temperature DP is acquired, the power control unit 132 sets an index temperature line Lv (a function) in accordance with the dew-point temperature DP (step S4).

The index temperature line Lv is preferably set in such a manner as to include a margin for which the difference between a temperature of the inner surface of the windshield 11 and a temperature detected by the temperature sensor 15 is taken into consideration.

Alternatively, the index temperature line Lv can be set in such a manner as to indirectly include the margin by estimating the ventilation volume Xair for the cockpit 2 to a minimum or estimating the humidification amount Xman by the crews to a maximum.

Specifically, the index temperature line Lv is a line connecting the point P1 and the point P2. The point P1 representing a first preset temperature T1, which is the dew-point temperature DP plus a predetermined first margin α (e.g., 5° C.), and the maximum input (100%; high input power), which corresponds to the first preset temperature T1. The point P2 representing α second preset temperature T2, which is the dew-point temperature DP plus a second margin β larger than the first margin α (e.g., 10° C.), and the minimum input (0%; low input power), which corresponds to the second preset temperature T2. The first preset temperature T1 is lower than the first temperature t1 at which the index temperature line Lf used in the high-power mode M2 (FIG. 3A) is defined. Also, the second preset temperature T2 is lower than the second temperature t2 at which the index temperature line used in the high-power mode M2 is defined.

The power control unit 132 supplies the heater 12 with an input value that is determined by applying the detected temperature detected by the temperature sensor 15 to the above index temperature line Lv (step S5).

The power control unit 132 performs feedback control on the heater 12 so as to bring about an equilibrium state where no exchange of heat occurs between the heater 12 and the surroundings thereof. For example, when an input power Ip1 corresponding to a detected temperature Ts1 by the temperature sensor 15 is provided to the heater 12 at some time point, and the detected temperature is increased (Ts2) by heat generated by the heater 12, an input power Ip2 corresponding to the detected temperature Ts2 is supplied to the heater 12. The repetition of the above results in a position of equilibrium (Ts0, Ip0).

Note that not only feedback control but also an appropriate well-known control method can be employed.

Figure 3B:
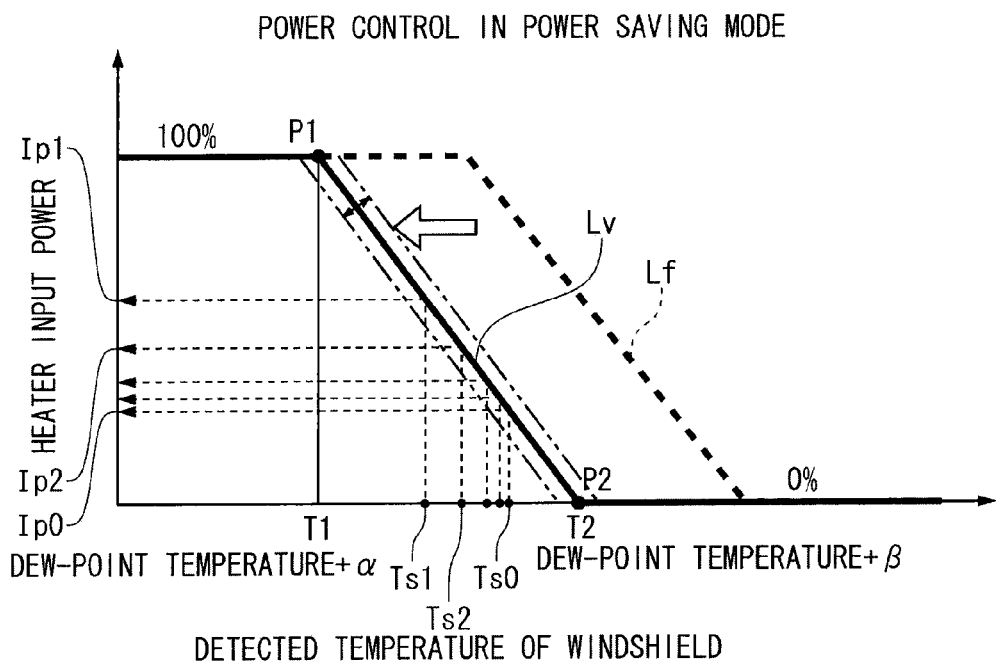
FIG. 3B is a graph for the description of power control in a power saving mode.

When the dew-point temperature of the inside of the cockpit 2 acquired in step S3 changes as an outboard temperature, a pressure, or the like changes, the index temperature line Lv defined in accordance with the dew-point temperature is updated (step S4). FIG. 3B illustrates an example of an updated index temperature lines Lv using chain double-dashed lines. A source power determined by applying the detected temperature by the temperature sensor 15 to the updated index temperature line Lv is input to the heater 12 (step S5).

According to the present embodiment, the windshield 11 is heated to a required degree that fogging does not occur by providing to the heater 12 a heater input value that has a relationship with the dew-point temperature DP. Thus, it is possible to avoid the consumption of a high power in a case where fogging does not actually occur, thereby enabling the achievement of power saving. As illustrated by a solid-white arrow in FIG. 3B, in the power saving mode M1, it is possible to significantly reduce the input power to the heater 12 as compared with the high-power mode M2.

The present embodiment employs feedback control in which the actually measured value of the heater 12 is reflected in a power-source input value to the heater 12, and moreover, the index temperature line Lv used to determine the power-source input value to the heater 12 is also updated in accordance with a dew-point temperature, and thus the windshield 11 is optimally heated, thereby enabling a further achievement of power saving.

Driving the heater 12 of the windshield 11 with the maximum input causes a heavy power consumption to a degree that the power consumption accounts for a major proportion to the total power consumed in the entire aircraft 1 for communication, illumination, and the like. Hence, controlling the heater 12 in the power saving mode M1 enables a significant reduction in the power consumption in the aircraft 1.

Furthermore, in the case of the aircraft 1, power supply in flight is fulfilled by a power generator installed in an engine, and thus the reduction of power consumption can improve fuel efficiency.

In addition, in the present embodiment, the presence of the iced condition is monitored, and when the presence of the iced condition is detected, automatic transition is performed from the power saving mode M1 to the high-power mode M2, and thus it is possible to reliably avoid the adherence of ice to the windshield 11, without requesting an operation such as anti-icing switching from a pilot.

In the present embodiment, a ventilation volume for the cockpit 2 and a humidification amount by crews can be retained in a storage device included in the controller 13, and the ventilation volume and the humidification amount can be input from the storage device to the dew-point temperature acquisition unit 131.

Modification of First Embodiment

In the above embodiment, the power saving mode M1 or the high-power mode M2 is automatically selected according to the detection result indicating the presence of the iced condition (step S1 in FIG. 2). The determination as to whether to perform the automatic selection can be entrusted to a pilot.

To implement this, the power control unit 132 can be provided with an automatic mode in which the power saving mode M1 or the high-power mode M2 is automatically selected, and a non-automatic mode in which the power saving mode M1 is not performed but the high-power mode M2 is always performed, and an automatic heater input operating switch, which allows switching operation between the automatic mode and the non-automatic mode, can be provided in the cockpit 2.

Figure 5:
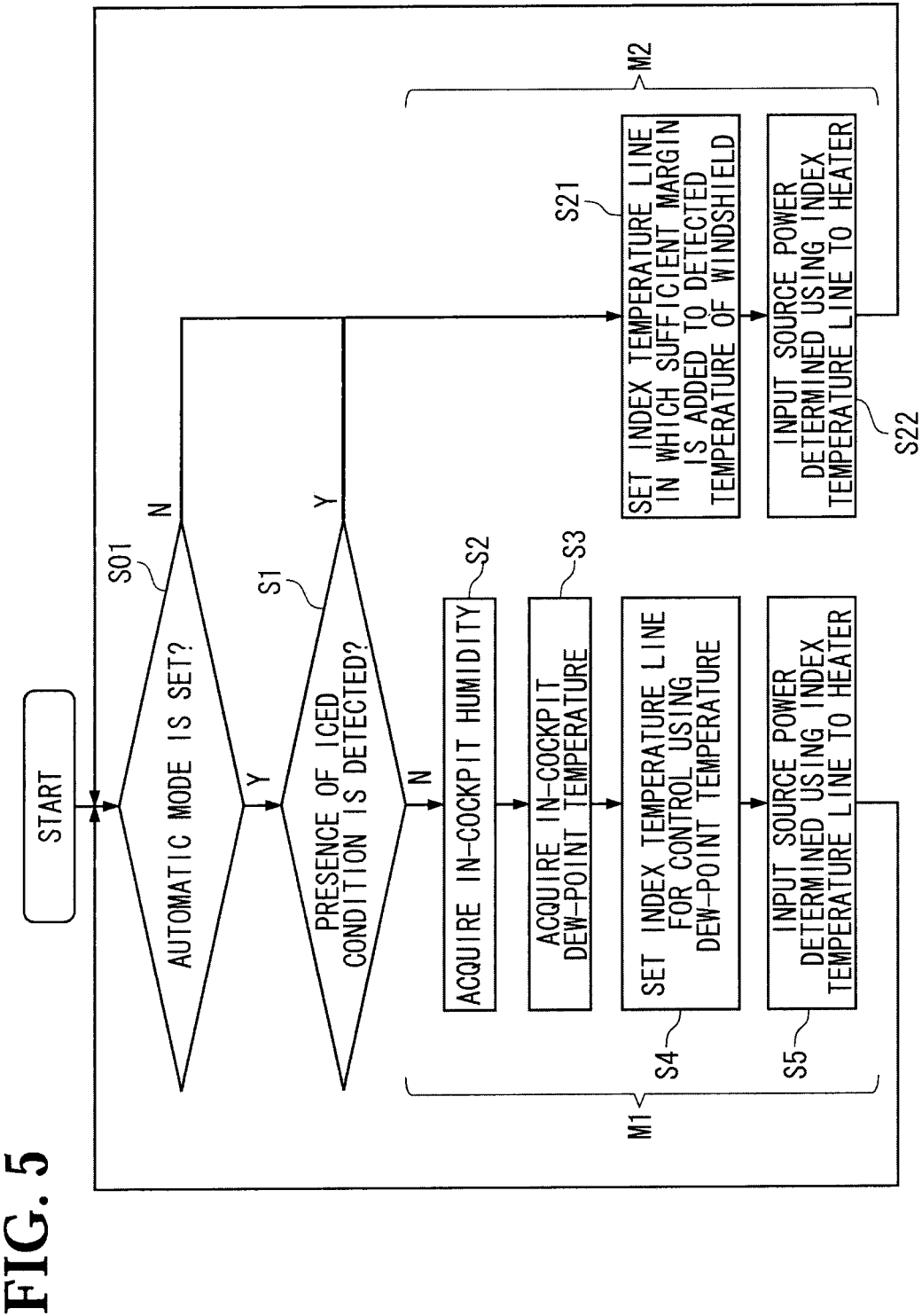
FIG. 5 is a diagram illustrating a modification of the first embodiment.

Then, as illustrated in FIG. 5, the power control unit 132 determines whether the automatic mode is set (step S01), and only if the automatic mode is set by the operation of the automatic heater input operating switch (Y in step S01), the power saving mode M1 or the high-power mode M2 is automatically shifted to.

If the non-automatic mode is set by the operation of the automatic heater operating switch (N in step S01), power control is performed on the heater 12 always in the high-power mode M2.

According to the above, through the determination by a pilot, it is possible to more reliably perform anti-icing and anti-fogging on the windshield 11, being provided with an output of the heater 12 having a sufficient margin.

In addition, it is possible to configure the power saving mode M1 and the high-power mode M2 to be switched to by an operation by a pilot.

To implement this, an operating switch for switching a heater input, the switch is capable of switching operation between the power saving mode M1 and the high-power mode M2, can be provided in the cockpit 2.

Figure 6:
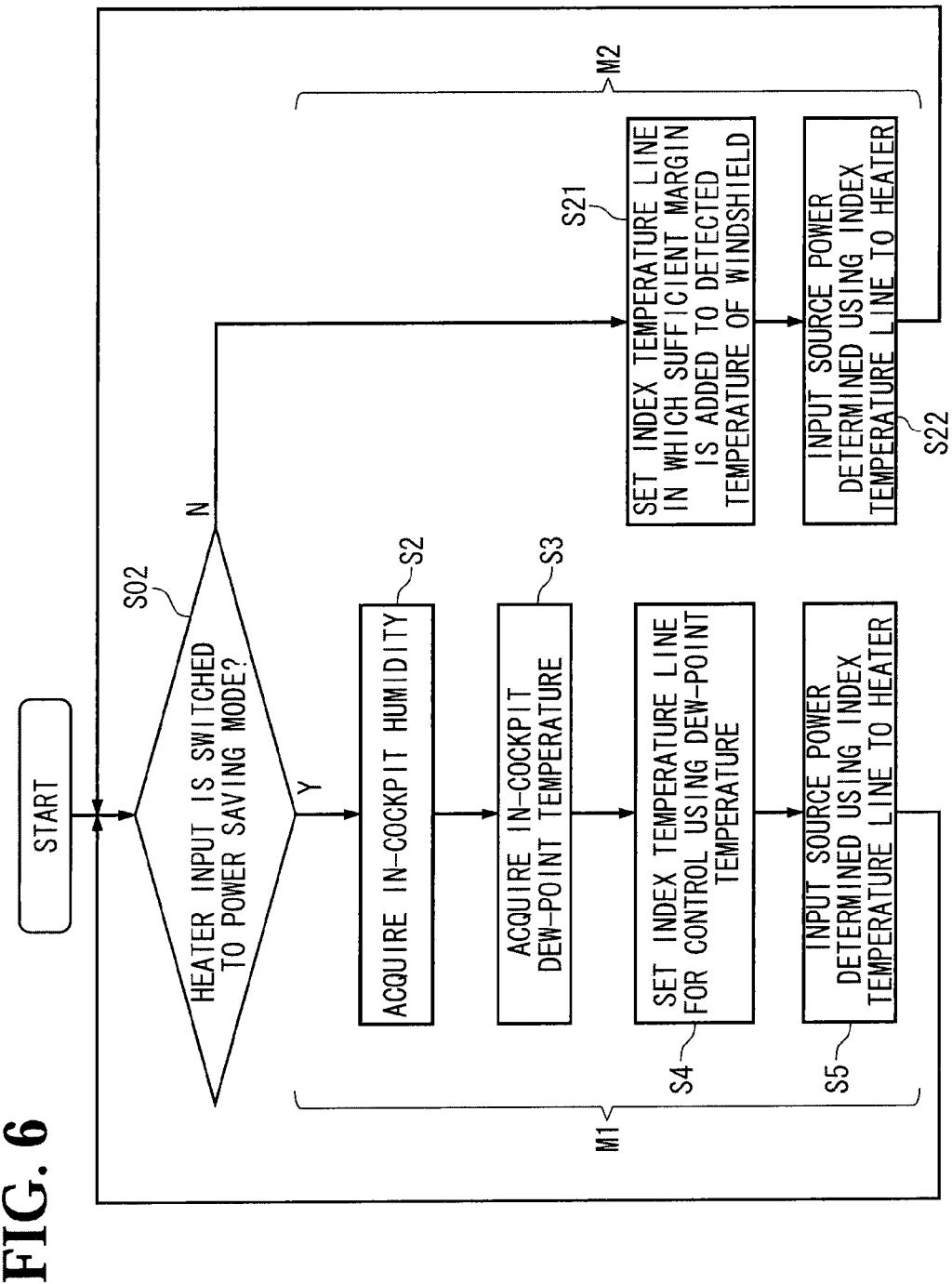
FIG. 6 is a diagram illustrating a modification of the first embodiment.

Then, as illustrated in FIG. 6, according to the switched state of the heater input switch operating switch for switching a heater input (step S02), the power saving mode M1 or the high-power mode M2 is shifted to.

The windshield 11 includes the front windshields and the side windshields. Power controls applied to the front windshields and the side windshields may be the same or different from each other.

For example, it is possible to apply the power control described with reference to FIG. 5 to the front windshields, and apply the power control described with reference to FIG. 6 to the side windshields.

Second Embodiment

Figure 7A:
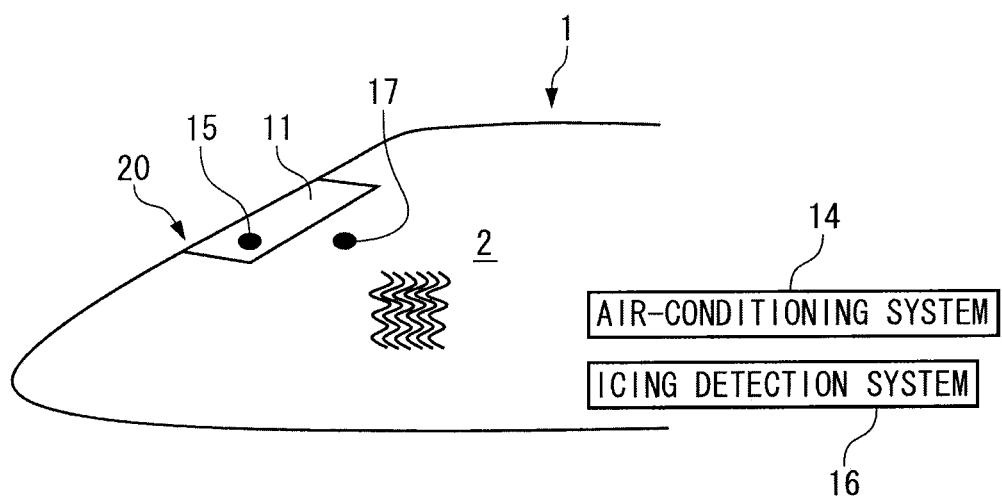
FIG. 7A is a schematic diagram illustrating the cockpit and a windshield of an aircraft according to a second embodiment.

Next, a second embodiment of the present invention will be described with reference to FIG. 7 and FIG. 8.

Matters different from the first embodiment will be described below.

Figure 7B:
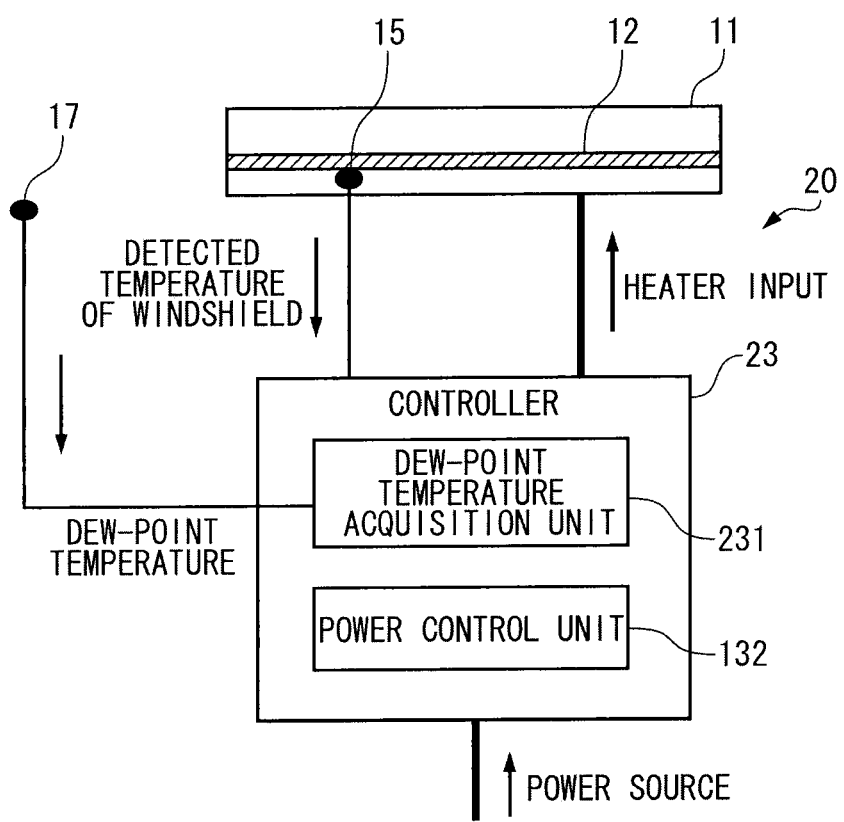
FIG. 7B is a block diagram illustrating the heater of the windshield, a controller, and pieces of information used for power control of the heater.

A windshield device 20 of the second embodiment includes, as illustrated in FIG. 7B, a controller 23 that receives the dew-point temperature of the inside of the cockpit 2. To a dew-point temperature acquisition unit 231 provided in the controller 23, a dew-point temperature is transmitted, the dew-point temperature being detected by a humidity sensor 17 (FIG. 7A), which is disposed in the cockpit 2.

The second embodiment dispenses with the calculation for acquiring the dew-point temperature DP described in the first embodiment.

Figure 8:
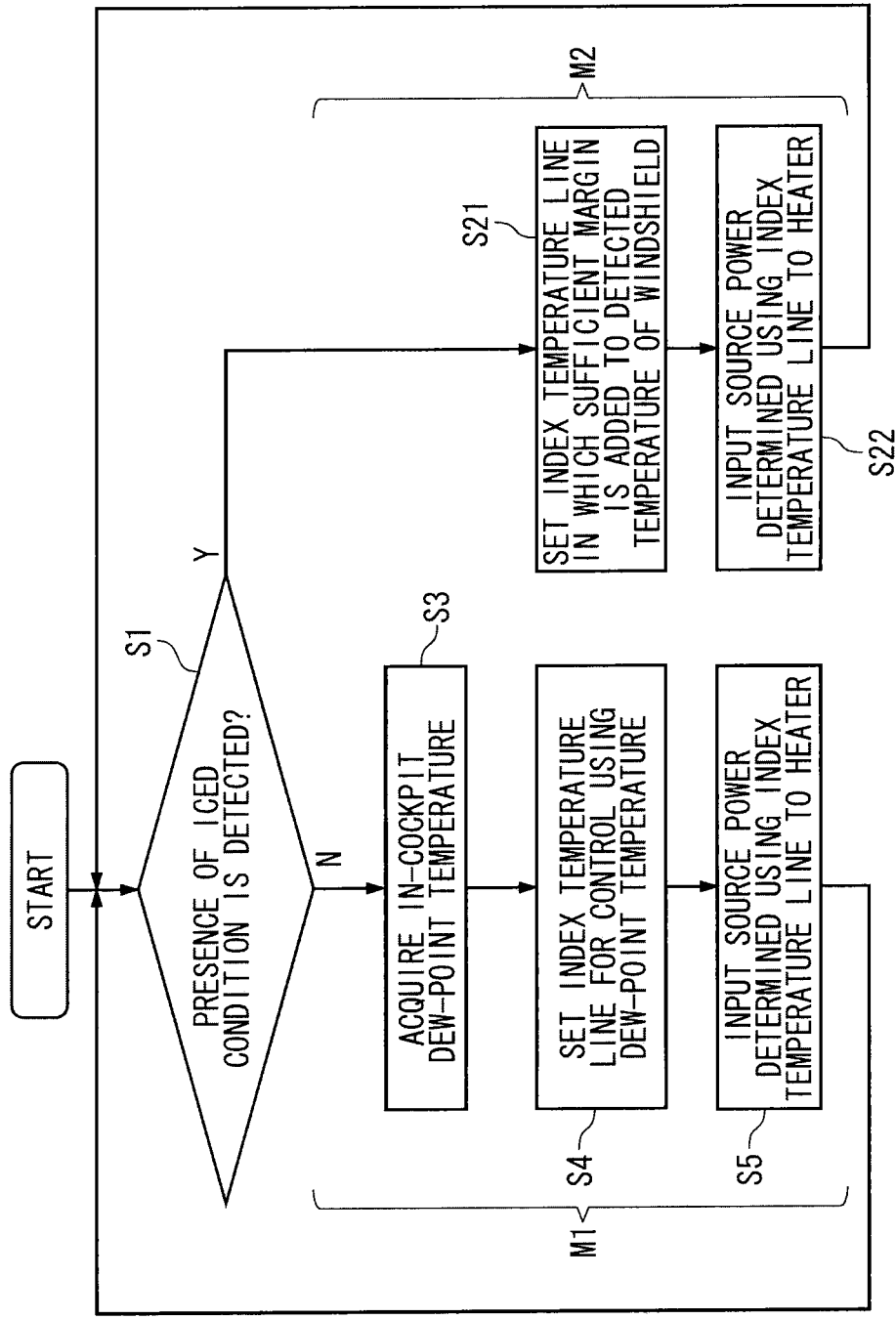
FIG. 8 is a flow chart illustrating the power control process of the heater in the second embodiment.

In the second embodiment, as illustrated in FIG. 8, the humidity sensor 17 acquires the dew-point temperature (step S3), and power control is performed on the heater 12 based on an index temperature line that is determined using the dew-point temperature (steps S4 and S5).

FIG. 8 illustrates an example in which the power saving mode M1 or the high-power mode M2 is automatically shifted to in accordance with the detection result indicating the presence of the iced condition (step S1), but the second embodiment is not limited to the example, and as illustrated in FIG. 5, the determination as to whether the automatic heater input selection mode is set (step S01) may be added, or as illustrated in FIG. 6, the control modes M1 and M2 of the heater 12 may be switched to in accordance with the switched state of the operation switch.

Figure 9:
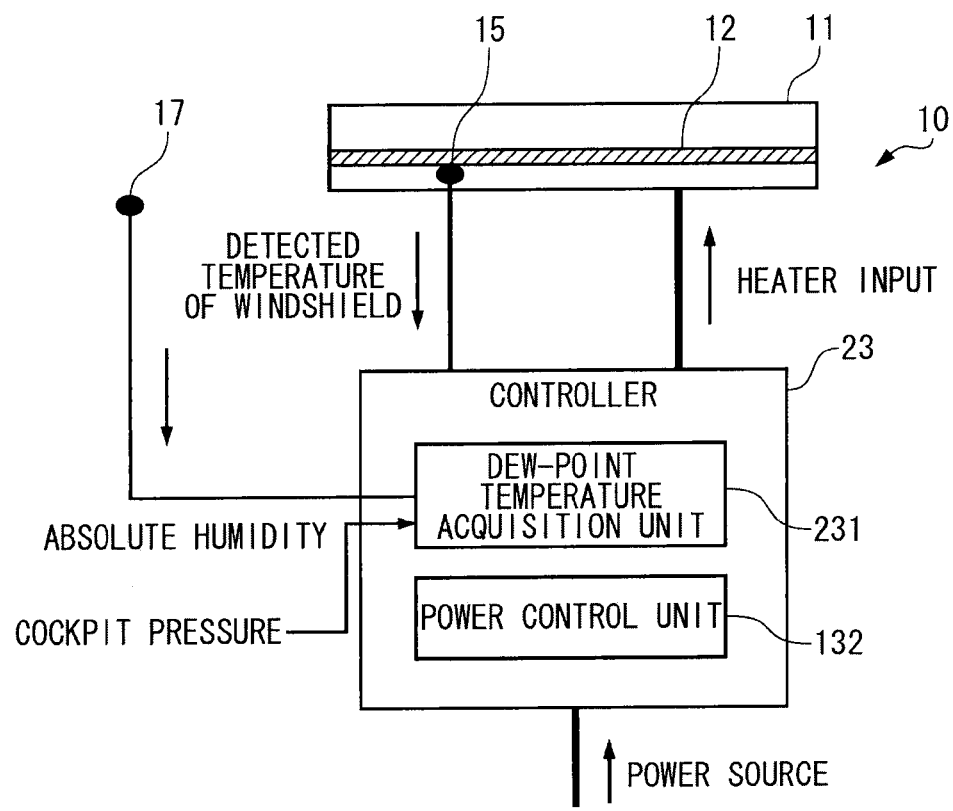
FIG. 9 is a block diagram illustrating a modification of the second embodiment.

As illustrated in FIG. 9, in place of the dew-point temperature, the absolute humidity of the inside of the cockpit 2 may be input into the dew-point temperature acquisition unit 231. In this case, the pressure of the inside of the cockpit 2 is required to acquire the dew-point temperature, and the dew-point temperature acquisition unit 231 calculates the dew-point temperature from the absolute humidity and pressure of the inside of the cockpit 2.

According to the second embodiment, by appropriately performing power control on the heater 12 using a measured value from the humidity sensor 17, it is possible to reduce an unnecessary heater input, enabling a further achievement of power saving.

In the second embodiment, the humidity sensor 17 is preferably disposed in a place that is suitable to detect the state of air in contact with the inner surface of the windshield 11, taking consideration into the flow of air in the vicinity of the windshield 11 in the cockpit 2. Then, it is possible to accurately detect a dew-point temperature corresponding to the humidity of air in contact with the windshield 11 by the humidity sensor 17 even in the presence of the gradient of humidity in the cockpit 2, enabling a further achievement of power saving.

Besides, the configurations described in the above embodiments can be selected, or can be changed as appropriate to any other configurations without departing from the gist and scope of the present invention.

Figure 10:
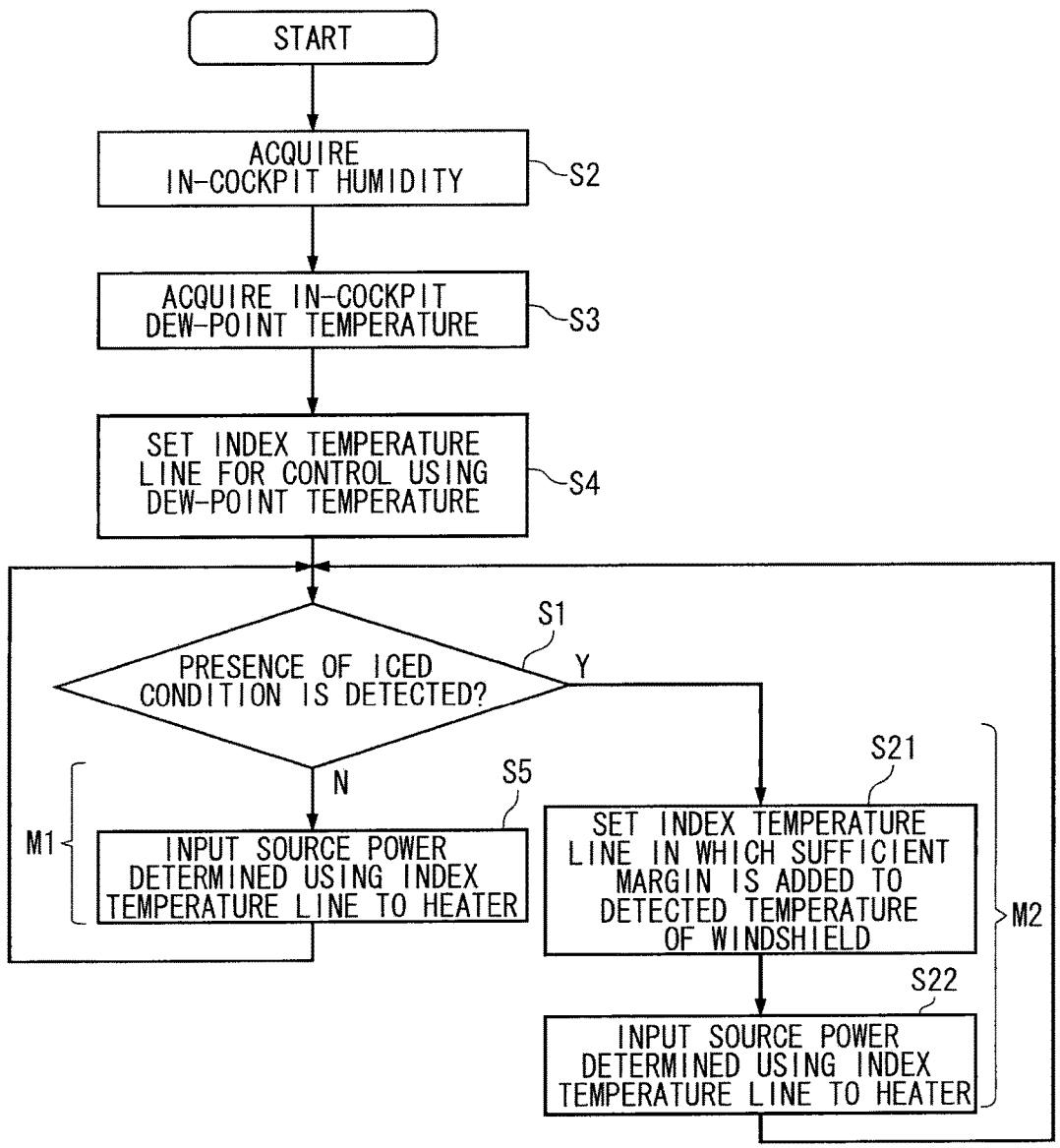
FIG. 10 is a flow chart illustrating the power control process of a heater according to a modification of the present invention.

The present invention also includes the case where the dew-point temperature of the inside of the cockpit 2 is not necessarily acquired continuously but acquired at intervals, if the conditions of anti-fogging are met. For example, as illustrated in FIG. 10, if the dew-point temperature of the inside of the cockpit 2 is acquired (step S2 and step S3) in flight or prior to a flight, and an index temperature line for the control in accordance with the dew-point temperature is set (step S4), it is allowed thereafter to perform power control on the heater 12, with the index temperature line set in step S4 used consistently (step S5).

The present invention is not limited to a windshield device for an aircraft and can be applied to a windshield device provided in transport machinery such as a train and a vessel.

What is claimed is:

1. A windshield device comprising:
a windshield;
a heater that is provided in the windshield and configured to generate heat by energization;
a temperature sensor that is provided in the windshield and configured to detect a temperature; and
a control unit that performs power control on the heater, wherein
the control unit is configured to supply an input power to the heater, the input power being acquired by applying a detected temperature detected by the temperature sensor to a function that is determined in accordance with a dew-point temperature of an inside of a compartment separated from an outside of the compartment by the windshield, wherein the dew-point temperature is obtained by using absolute humidity calculated based on:
a ventilation volume between the inside of the compartment and ambient air outside of the compartment,
an ambient humidity of the ambient air outside of the compartment, and
an additional humidification amount released from a moisture source into the inside of the compartment,
wherein the compartment separated from the outside of the compartment by the windshield is a cockpit of an aircraft.

2. The windshield device according to claim 1, wherein the control unit is configured to perform feedback control on a temperature of the heater using the detected temperature.

3. The windshield device according to claim 1, wherein the control unit is configured to update the function in accordance with the dew-point temperature.

4. The windshield device according to claim 1, wherein the function is expressed by an index temperature line that connects:
a point representing a first preset temperature and a high input power for the heater corresponding to the first preset temperature, the first preset temperature being the dew-point temperature plus a first margin; and
a point representing a second preset temperature and a low input power for the heater corresponding to the second preset temperature, the second preset temperature being the dew-point temperature plus a second margin that is larger than the first margin.

5. The windshield device according to claim 1, wherein the control unit has a power saving mode in which the input power having a relationship with the dew-point temperature is supplied to the heater, as one of a plurality of modes for performing power control on the heater.

6. An aircraft comprising the windshield device according to claim 1.

7. The windshield device according to claim 1, further comprising:

a dew-point temperature acquisition unit that is configured to calculate the dew-point temperature on the inside of the compartment, based on:
the absolute humidity; and
a pressure of the inside of the compartment.

8. The windshield device according to claim 1, wherein the ventilation volume and the additional humidification amount are acquired from an air-conditioning system installed in the aircraft.

9. A power control method for a windshield heater, comprising:
supplying an input power to the heater, the input power being acquired by applying a detected temperature of a windshield to a function that is determined in accordance with a dew-point temperature of an inside of a compartment separated from an outside of the compartment by the windshield, wherein the dew-point temperature is obtained by using absolute humidity, and wherein the absolute humidity is calculated based on:
a ventilation volume between the inside of the compartment and ambient air outside of the compartment,
an ambient humidity of the ambient air outside of the compartment, and
an additional humidification amount released from a moisture source into the inside of the compartment,
wherein the compartment separated from the outside of the compartment by the windshield is a cockpit of an aircraft.

10. The power control method for a windshield heater according to claim 9, further comprising:
a first step of detecting a presence of an iced condition in which icing occurs on the windshield; and
a second step of supplying the input power having a relationship with the dew-point temperature to the heater, wherein
the second step is performed when the presence of the iced condition is not detected in the first step.

11. The power control method for a windshield heater according to claim 9, wherein
a high-power mode and a power saving mode can be switched to,
the high-power mode being a mode in which an input power in conformity with a detected temperature of the windshield is supplied to the heater,
the power saving mode being a mode in which the input power having a relationship with the dew-point temperature is supplied to the heater.

12. The power control method for a windshield heater according to claim 9, applied to the heater of the windshield provided in the aircraft.

13. The windshield device according to claim 9, further comprising:
calculating the dew-point temperature on the inside of the compartment, based on:
the absolute humidity; and
a pressure of the inside of the compartment.

* * * * *

UNITED STATES PATENT AND TRADEMARK OFFICE
CERTIFICATE OF CORRECTION

PATENT NO. : 10,046,860 B2
APPLICATION NO. : 15/041337
DATED : August 14, 2018
INVENTOR(S) : Toshiyuki Ishida et al.

It is certified that error appears in the above-identified patent and that said Letters Patent is hereby corrected as shown below:

In the Specification

Column 7, Line 1, "We" should be -- Wc --.

Column 7, Line 64, "α" should be -- a --.

Signed and Sealed this
Sixteenth Day of October, 2018

Andrei Iancu
*Director of the United States Patent and Trademark Office*